United States Patent [19]

Pargee, Jr.

[11] 4,429,332

[45] Jan. 31, 1984

[54] TELEVISION COMPRESSED AUDIO

[75] Inventor: Robert W. Pargee, Jr., San Clemente, Calif.

[73] Assignee: EECO Incorporated, Santa Ana, Calif.

[21] Appl. No.: 264,744

[22] Filed: May 18, 1981

[51] Int. Cl.³ .................... H04N 5/783; H04N 5/92
[52] U.S. Cl. ................................. 358/143; 358/134
[58] Field of Search ............... 358/143, 145, 147, 127, 358/134

[56] References Cited

U.S. PATENT DOCUMENTS

| | | | |
|---|---|---|---|
| 3,789,137 | 1/1974 | Newell | 358/143 |
| 3,909,512 | 9/1975 | Omori | 358/143 |
| 3,950,607 | 4/1976 | Southworth | 358/134 |

OTHER PUBLICATIONS

Still Picture Television, NHK Technical Research Lab., Jun. 1979.
Experimental Transmission System of Still Picture Broadcasting, by H. Ando, et al., NHK Laboratories Note, Ser. No. 158, Feb. 1973, pp. 2-15.

*Primary Examiner*—Tommy P. Chin
*Attorney, Agent, or Firm*—Harry R. Lubcke

[57] ABSTRACT

A ten second interval of audio frequency information is sampled, digitized, and stored in a memory. It is then read out of the memory very many times faster, say 400 times faster, converted to analog, combined with television synchronizing signals and transmitted as a signal television frame. That signal is received, converted from analog to digital, stored at high speed, and then read out at an audio frequency rate, to thereby recover the original ten seconds of audio frequency information.

18 Claims, 9 Drawing Figures

TELEVISION COMPRESSED AUDIO

BACKGROUND OF THE INVENTION

This invention pertains to transmitting highly time-compressed audio frequency information over a television video channel.

The format of a television video channel is well known. The NTSC standard in the United States may be taken as a suitable example. The bandwidth of the channel is approximately 4.5 megahertz (MHz). Analog electrical variations produced by scanning a visual scene are produced along each line, which is initiated and terminated by the horizontal blanking interval and carries a horizontal synchronizing pulse. The analog electrical variations occupy one side of the axis of the video waveform and the synchronizing and blanking pulses occupy the other side.

The NTSC standard utilizes 525 lines per frame in scanning over the visual scene. These are separated into two fields of half as many lines, interlaced, so that all of the even numbered lines are scanned in one field and all of the odd numbered lines are scanned in the next field. Each field is executed in 1/60th second, thus one frame is executed in 1/30th second.

Color television is accomplished by adding certain auxiliary pulses on the back porch of the horizontal blanking interval, but this is of no moment in the practice of this invention.

It would be possible to modulate a sequence of sound upon a frame of television waveform, particularly if the line synchronizing and blanking pulses were omitted. However, since the duration of a frame is only 1/30th second, only part of one syllable of speech would be transmitted over the television video channel. Any greater duration would seriously interrupt the television synchronizing process and the attempt would be impractical.

SUMMARY OF THE INVENTION

According to a typical embodiment of this invention it is possible to place 10 seconds of sound in one frame of television and not interrupt or intefere with the video synchronization.

The invention is accomplished as follows.

The audio frequency information (speech, music, etc.) is sampled and digitized for a 10 second interval. The digital signal is stored in a memory. That signal is then read out of the memory at a rate very many times faster than audio frequencies say 400 times faster. This fast signal is then converted to analog form and combined with the usual line and field synchronizing pulses and transmitted over a video channel at video frequencies.

The received signal is then again converted from analog to digital form and is stored in a memory at video speed. The signal is then read out of the memory at an audio rate and the original audio frequency information is recovered. It may be read out of the second memory at once, or at any subsequent time.

DETAILED DESCRIPTION OF THE PREFERRED EMBODIMENTS

Figure 1:
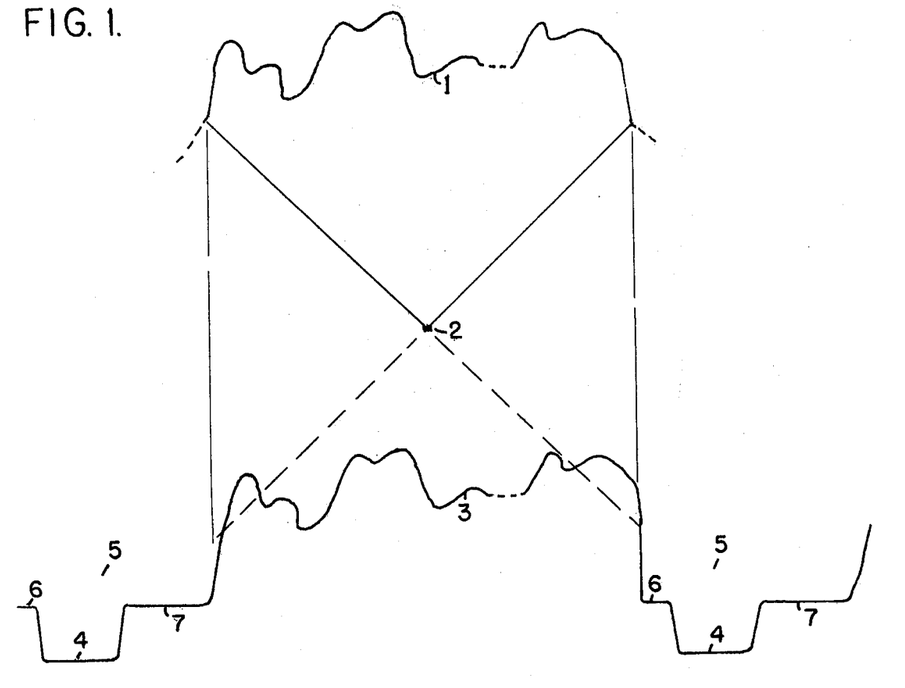
FIG. 1 is a waveform drawing, illustrating the normal and the time-compressed audio information.

In FIG. 1 numeral 1 identifies a sequence of audio frequency waveform, say of 20 milliseconds duration. Waveform 2 is the same but compressed approximately 400 times according to this invention, and shown on the same time scale as waveform 1. Obviously, the showing of waveform 2 is so minute that no detail can be seen, since the duration is approximately 50 microseconds in duration.

Waveform 3 is a detailed showing of waveform 2, on an expanded time scale of approximately 400 times that of waveform 2. This detail is for illustration and does not represent an expansion of the compressed waveform; save that this aspect does occur at the receiver apparatus.

Considering these waveforms in detail and relating them to apparatus, waveform 1 includes a time period during which 300 samples are taken at a 15.026 kilohertz (KHz) sampling rate. This defines a time period of 19.965 milliseconds.

Waveform 2 is best considered by examining the expanded showing of waveform 3. Therein, numeral 3 identifies only the compesed result of waveform 1. This audio information is now made a part of a horizontal television scanning line, which also includes synchronizing pulse 4 and horizontal line blanking pulse 5. The latter pulse has known front porch 6 and rear porch 7.

In waveform 3, the known NTSC interval "H", representing a total horizontal line with accompanying synchronizing and blanking, has a duration of 63.556 microseconds ($\mu$s). Of this, the net equivalent of audio information, previously 300 samples, now becomes 300 cycles of the frequency 6.0105 MHz and occupies a time period of 49.913 $\mu$s. This is preceded by an interval of 62 cycles of this frequency, a period of 10.315 $\mu$s, which encompasses both synchronizing pulse 4 and back porth 7 of blanking pulse 5. It is followed by an interval of 20 cycles of 6.0105 MHz frequency, a period of 3.328 $\mu$s, which encompasses the front porch of the next television line.

In the practice of this invention according to the illustrative example being given, the above process is carried on for one complete television frame of 525 lines, save for the exclusion of 22 lines occupied by the vertical blanking interval. As set forth above, each line has a useful duration of 49.913 $\mu$s out of a total time of 63.556 $\mu$s because of the time required to maintain uninterrupted television synchronization. This results in a net effective time reduction ratio of approximately 300 to 1, although the frequency ratios give a 400 to 1 ratio.

Notwithstanding, the period of reproduced aural transmission is approximately 10 seconds per television frame of 1/30th second, and the audio quality of the original is not impaired in any way.

One use for this invention is to provide verbal comment or other audible sound to accompany the still frame or frames of a complete television image according to my copending U.S. patent application, Ser. No. 249,792, filed Apr. 1, 1981, entitled "Television Burst Service".

Figure 2:
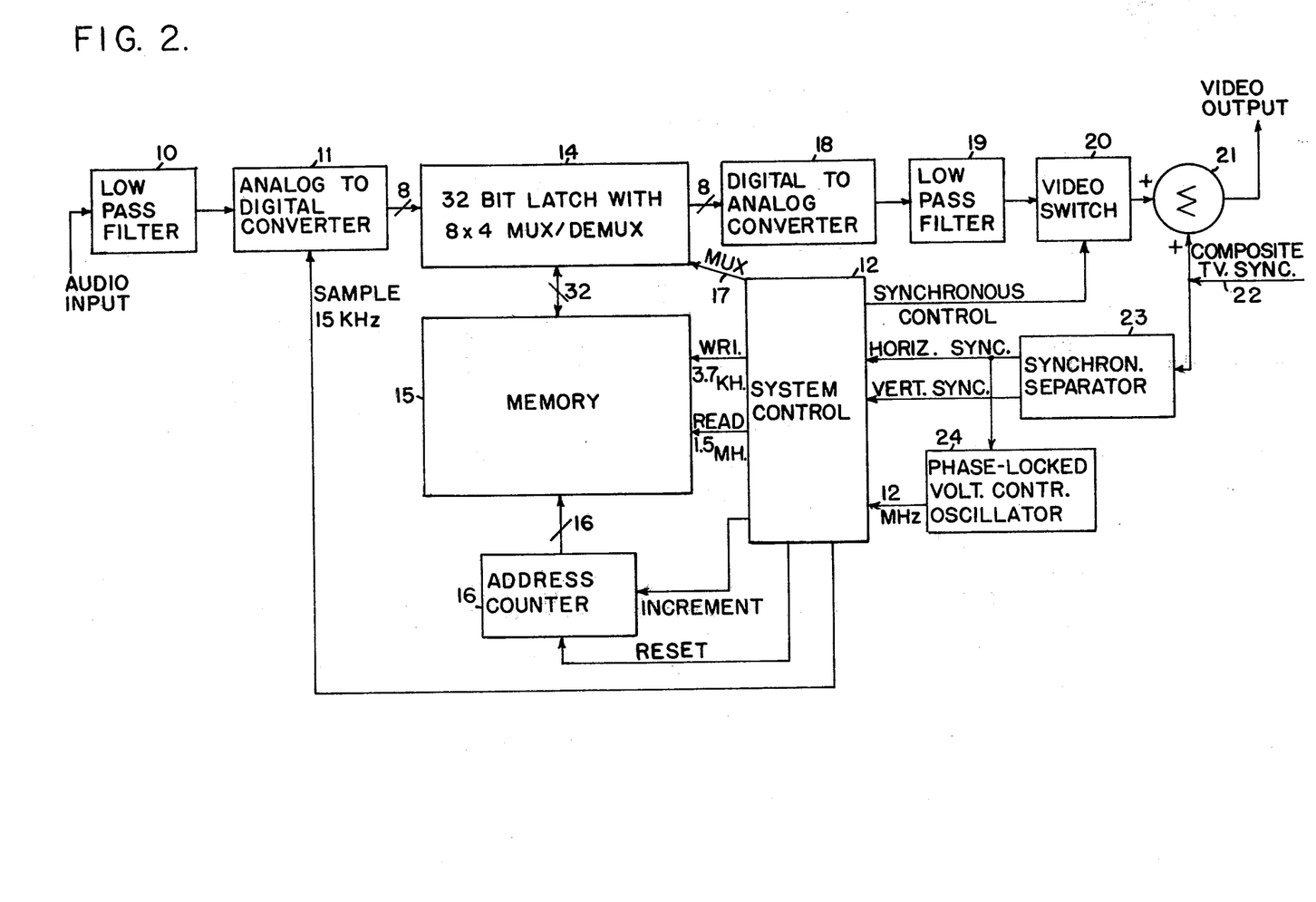
FIG. 2 is a block diagram of the apparatus for transmitting compressed audio on a video channel.

Turning to FIG. 2, low pass filter 10 accepts an original audio frequency input. This may be any type of speech, music and/or sound. Any degree of fidelity is possible according to the invention, the apparatus and the sampling frequencies being suitably chosen. For the present example, a maximum audio frequency of 7 KHz has been chosen. Filter 10 starts to cut off at this frequency and by 7½ KHz is at a very low pass level. This prevents aliasing. The duration of the reproduced audio is 10 seconds. A sampling rate of 15.026 KHz is chosen to actuate "analog to digital converter" 11, which accepts the output of filter 10.

If a voice type communication maximum audio frequency of 3½ KHz is wanted, a 3½ filter can be substituted and the sampling frequency may be half of the 15.026 KHz former value. This configuration will compress approximately 20 seconds of audio into one television frame.

Further, a 3 MHz television effective bandwidth has been hereinabove predicated. If this is extended to 4½ MHz, any of the previous time durations are extended proportionally; i.e., 10 sec. to 15 sec., 20 sec. to 30 sec., and so on. These relations are proportionally related; thus, any desired trade-off can be arranged, including 15 KHz fidelity, a 30.052 KHz sampling rate, a 7½ seconds time duration with the 4½ MHz bandwidth, etc.

As mentioned, the low pass filter prevents aliasing; i.e., the generating of spurious signals in the desired audio band if the sampling rate is less than twice the highest desired audio frequency. The alias signals are at a low level and so low pass filter 10 is not required for operability of the present invention, but its use provides superior over-all performance.

The sampling frequency comes from system control entity 12, and is preferably significantly related to the horizontal television scanning rate of 15.734 KHz.

An 8 bit digital output exits converter 11 and via 8 conductors enters latch 14. This is typically a 32 bit latch with 8×4 multiplex (MUX)/ demultiplex (DEMUX) capability. The 8 bit digital number represents the analog audio voltage at each instant of time. There are 15,026 of these numbers every second.

While the digitized audio information is read into memory 15 at a rate well within the frequency limit thereof, the readout is approximately 400 times faster. Accordingly, the memory is organized to be 32 bits wide. This takes into account four 8 bit samples. This information is stored sequentially in the 32 bit latch 14. With every four samples of 8 bits the latch is filled. One 32 bit word is then written into the memory, at a rate of 3.76 KHz.

The size of memory 15 is 32 bits wide by 3×16,384 deep. This is sufficient to store approximately 10 seconds of audio frequency information. The loaded memory holds approximately 150,000 samples. A 32 conductor connection runs between latch 14 and memory 15.

Address counter 16 is connected to memory 15 by 16 conductors. At the start of the conversion of the audio input at filter 10 to digital form at 11, address counter 16 is reset to zero by system control 2. The counter is also incremented after each write operation by system control 12.

The audio frequency information is subsequently converted to "video" information by a very rapid readout from memory 15. This may take place immediately after the memory is filled, or at a somewhat later time when the status of the television format and the request for the audio information so dictate.

For readout, the address counter 16 is again set to zero so that the readout sequence of bits is the same as the sequence written into the memory. Readout clock pulses, at 1.5 MHz, also from system control 12, unload the memory through latch 14, one 32 bit word each 667 nanoseconds.

Between the 667 nanosecond readouts, multiplexing at a 6 megahertz rate occurs to change the stored 32 bit word to 4 words of 8 bits. This is accomplished over connection 17 from system control 12 to latch 14.

These numerous words of 8 bits pass via 8 conductors from latch 14 to "digital to analog converter" 18, where conversion to analog takes place at the 6 MHz rate.

The now single-conductor analog information passes into low pass filter 19, which has a cutoff frequency of 2.8 MHz. The pass amplitude is strongly attenuated at 3.0 MHz and higher. This is to remove high frequency components associated with the 6 MHz digital to analog conversion.

"Video switch" 20 is connected to filter 19 to accept the audio information now made into a "video" frame. Synchronous control of the switch, predicated upon NTSC (or equivalent) television synchronizatin, is accomplished by a connection from system control 12. The output from switch 20 passes on to "summing junction" 21. Full composite television synchronization, having horizontal synchronizing and blanking pulses and vertical synchronizing and blanking pulses, as according to the NTSC standard, or equivalent, is provided upon incoming conductor 11, from external means; viz., the television system with which the equipment of this invention coacts.

The video output from summing junction 21 is comprised of the full composite television synchronizing pulses, with the audio at video frequency fitted between these pulses. The combined waveform has the appearance of a typical video waveform, but the information between the pulses is compressed audio.

Conductor 22 also connects to synchronizing separator 23, in which the horizontal and the vertical synchronizing pulses are separated from each other and pass into system control 12 for synchronizing thereto all significant operations of the apparatus of this invention.

Phase-locked voltage controlled oscillator (VCO) 24 is synchronized to the separated horizontal synchronizing impulses from separator 23. The operating frequency is 12.021 MHz. This passes into system control 12, where it is used to provide the clock signal for the microprocessor, the 6.0105 MHz digital to analog conversion frequency, related memory and logic clock frequencies within the system control, and the 15.026 KHz analog to digital conversion frequency.

Figure 3:
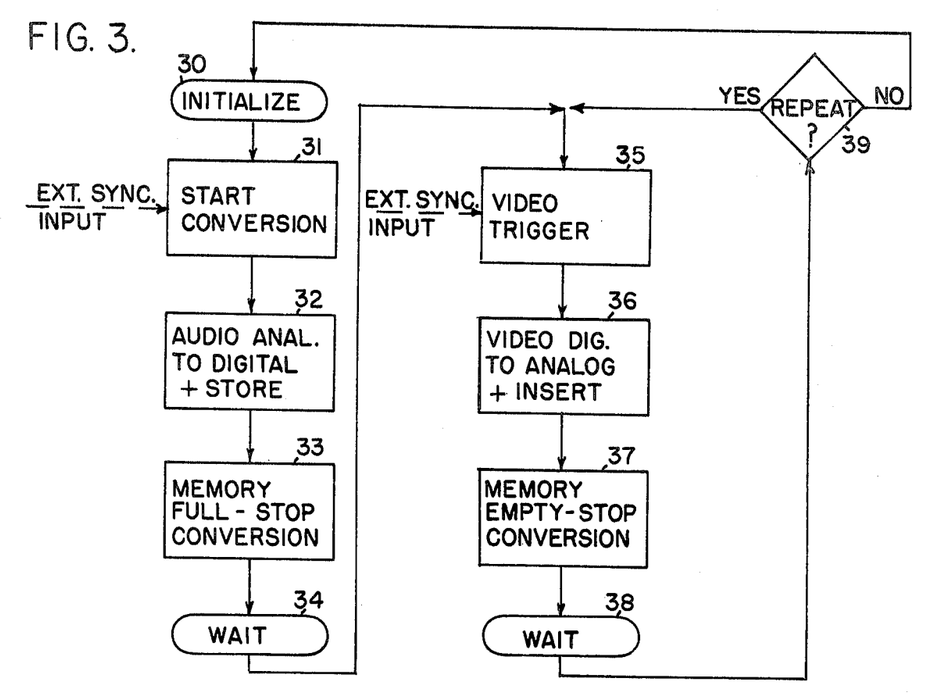
FIG. 3 is the flow chart for the transmitting apparatus.

FIG. 3 is the flow chart for the apparatus of FIG. 2, which accepts an audio input and provides compressed audio in a video format. The flow chart functions are controlled by system control 12.

Initialize function 30 acts to ready the apparatus for processing. Upon receiving an "external synchronizing input" "start conversion" function 31 accepts what is the audio at the input of FIG. 2. Conversion continues, with conversion of the "audio analog to digital" in function 32, also storing; these being the functions of elements 11, 14 and 15 of FIG. 2. When "memory is full", as sensed by address counter 16 of FIG. 2, "conversion is stopped"; function 33 in FIG. 3.

The next function is "wait", 34; i.e., the digital audio is in the memory and will stay there for an indefinite period of time, usually a few seconds or less.

When the video frame is about to begin, upon which it is desired to impress the audio information, an external video synchronizing input acts upon "video trigger" 35 and functions to start the readout from memory 15. This is at an affective 6.0105 MHz frequency, and with the aid of latch 14 in the demultiplex mode.

"Video digital to analog and insert", function 36, acts through digital to analog conversion entity 18, filter 19, and video switch 20. The conversion is made and the audio information in video form is inserted beween horizontal blanking pulses for each of the nominal 525 lines of the frame.

When "memory (15) is empty" is discerned by address counter 16 function 37 causes the reading from the memory to stop.

There is next another "wait" function 38, to allow, typically, an operator decision to be made as to whether the readout should be "repeated". If, for some reason, the frame was not recorded for subsequent transmission or permanent storage, the frame can be repeated, since it is still in memory 15.

This is decision point 39. If the answer is "yes", then 35 video trigger is reactivated. If the answer is "no", then the whole process is aranged for receiving the next frame, at initialize 30, memory 15 being reset too zero by a command from system control 12, through address counter 16.

In this way, one or any number of television frames are loaded with compressed audio, each subsequently capable of reproducing 10 seconds of audio.

Figure 4:
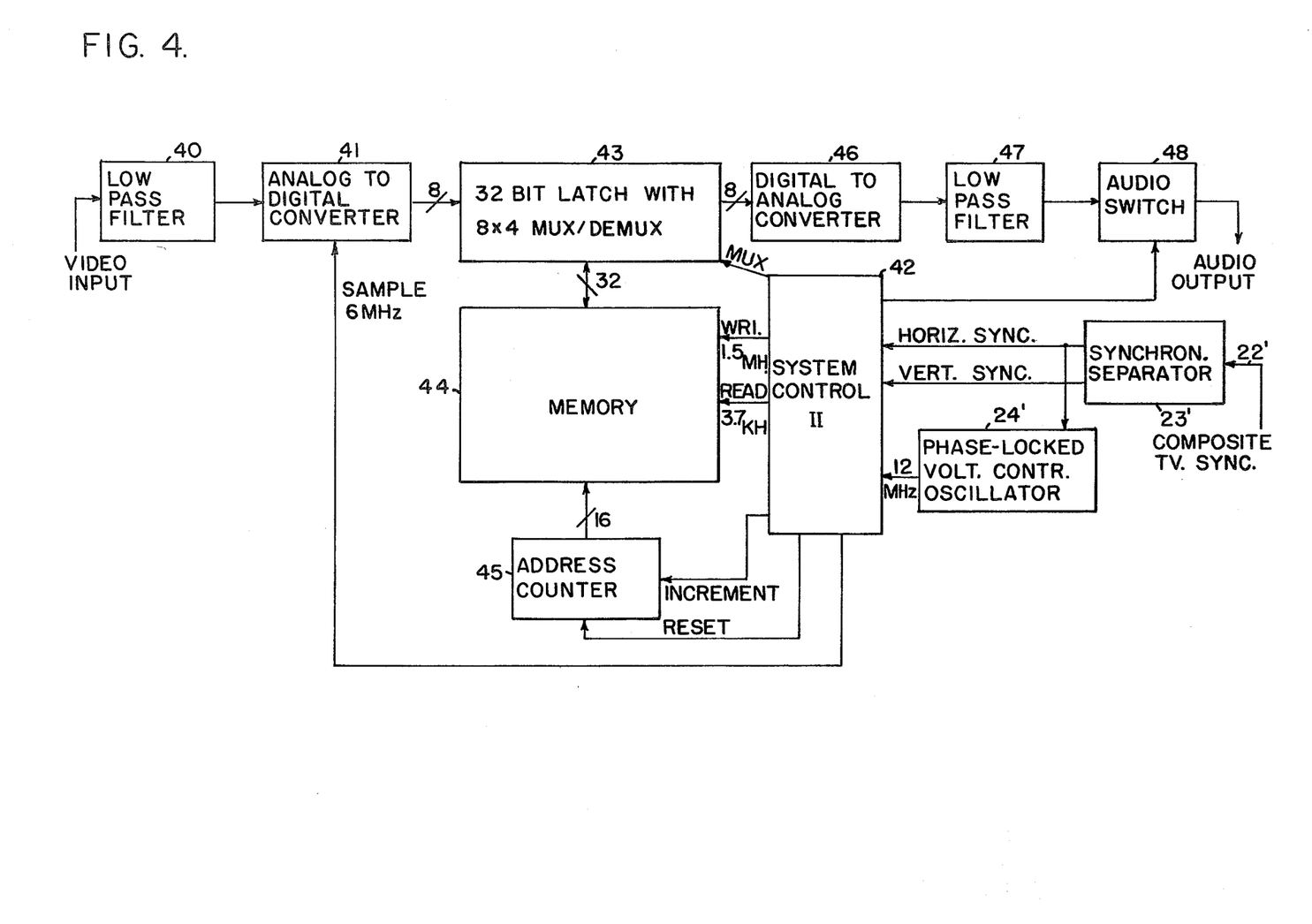
FIG. 4 is a block diagram of the apparatus for receiving compressed audio on a video channel.

FIG. 4 is the block diagram for receiving the compressed audio and decompressing the same so that it can be reproduced for normal hearing by a person.

FIG. 4 is similar to FIG. 2, with the exception that the process performed is reversed. In FIG. 2 an audio frequency input is transformed into a "video" frequency output. In FIG. 4 a "video" frequency input is transformed into an audio output. Most of the elements of apparatus are the same in both figures, but they are programmed and physically connected to operate in an inverse manner.

In FIG. 4, low pass filter 40 insures that the incoming "video" shall not have frequencies above 3 MHz, so that aliasing will be avoided when "analog to digital" entity 41 makes that conversion. It is supplied with 6.0105 MHz sample rate energy from "system control II" 42, which is essentially the same as system control 12 in FIG. 2. See FIG. 7 and flow charts 8A and 8B for details of these system control entities.

"Latch" 43, "memory" 44 and "address counter" 45 are the same as latch 14, memory 15 and counter 16 of FIG. 2. They are merely operated "backward"; i.e., the video signal input is in the megahertz range and the audio signal output is in the kilohertz range, the latter signal being the original audio frequencies.

While the sampling is at the 6.0105 MHz rate, the action of latch 43 is to reduce this rate to 1.5 MHz into memory 44. This is the same rate as the readout process was with memory 15.

"Address counter" 45 is used to store and recover the digital information in the same sequential order, starting from addrress zero.

The analog to digital conversion by "converter" 41 continues until the entire television frame has been loaded into memory 44. The timing relationships employed here are the same as were employed with respect to memory 15; television horizontal synchronizing pulses and a sampling clock being synchronous therewith. The bits of data are thus captured in the same memory location in memory 44 as they were in memory 15.

The local clock in "system control II" 42 synchronizes itself withh sufficient precision by locking onto the leading edge of the horizontal synchronizing pulses. It then counts down 62 cycles and then starts the sampling process. See the leading edge of pulse 4 in FIG. 1.

From memory 44 the information is read out of memory at an audio rate of 3.76 KHz, to give a 15.026 KHz digital sample frequency along an 8 conductor line to "digital to analog converter" 46. The information is now audio frequency in analog form and so one conductor passes it on to "low pass filter" 47, to eliminate high frequency components, as has been stated before. This filter is substantially cut off at 7½ KHz, as was previous audio filter 10.

The output of low pass filter 47 enters "audio switch" 48, which also receives an input from system control II 42. Switch 48 passes audio frequency information when such is occurring, but gates off this channel when such information is absent. This is arranged in control II and functions according to steps 132 and 138 of flow diagram 8B, to be discussed later.

The audio output from switch 48 is what was originally the input to low pass filter 10 in FIG. 2.

Certain inputs to system control II 42 are the same as in FIG. 2. Thus, primed identifying numerals have been used for incoming "composite synchronization"; i.e., 22', also for "synchronization separator" 23', and for "phase locked volt. contr. oscillator" 24'.

Figure 5:
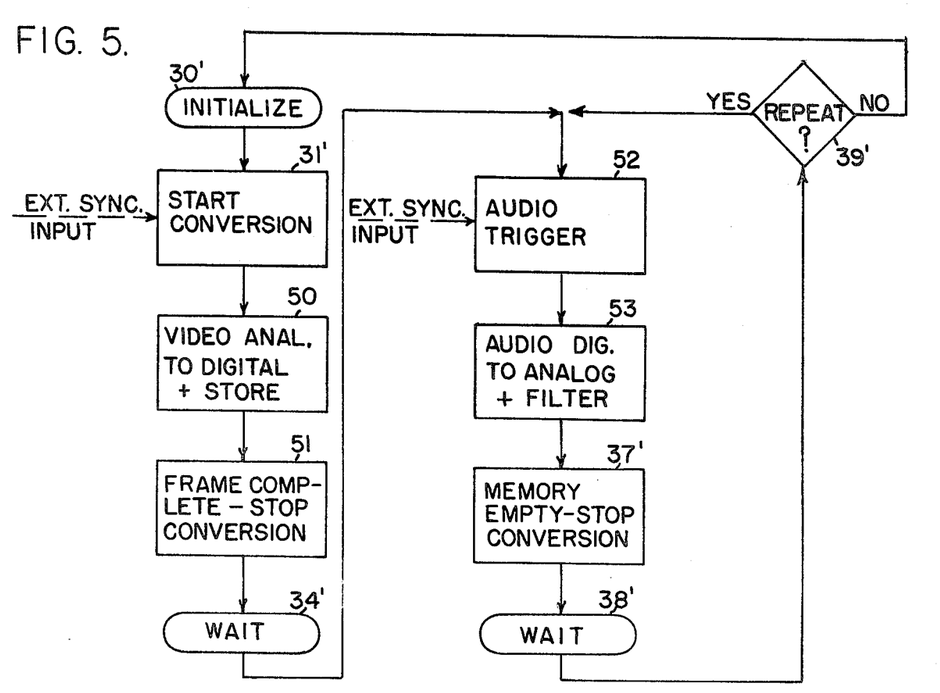
FIG. 5 is the flow chart for the receiving apparatus.

FIG. 5 is the flow chart for the apparatus of FIG. 4, which accepts a compressed audio ("video") input and decompresses it to an audio output. The flow functions are controlled by system control II 42.

The flow in FIG. 5 is the same as in FIG. 3, save that the video and audio functions are interchanged.

In FIG. 5, primed numerals have been used for functions that are the same as in FIG. 3; i.e., "initialize" 30', and "start conversion" 31'. The conversion continues, with conversion of the video from "analog to digital" 50, also storing. These are the functions of elements 41, 43 and 44 of FIG. 4. When the frame is completed, "stop conversion" function 51 takes place. The "wait" function 34' next occurs, as previously.

When it is time to utilize the audio, "audio trigger" 52 is energized by an external synchronizing input and audio frequency "digital to analog conversion" 53 takes place, as well as low pass filtering. Memory 44 is nondestructively "unloaded" in the process. Function 37' senses the memory to be "empty" and "stops the conversion".

Thereafter a second "wait" function 38 is encountered, with decision point 39' next in line to query "repeat?". If the answer is "yes", then audio trigger 52 is reactivated. If the answer is "no", then the whole process is arranged for processing the next frame of "video", at initialize 30'.

Figure 6:
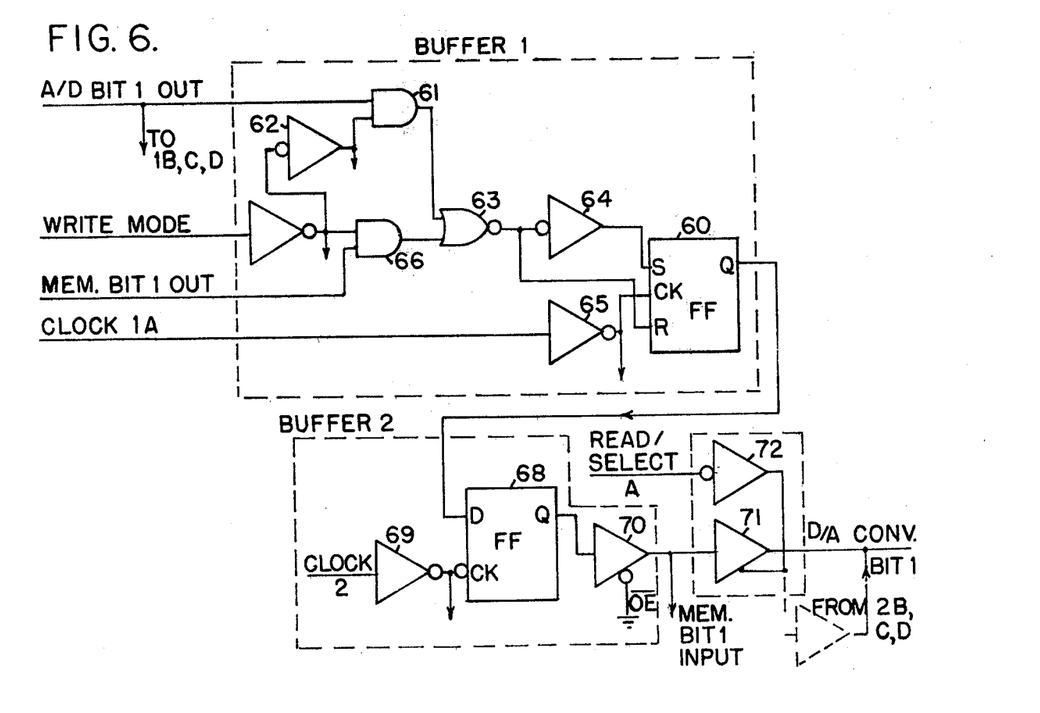
FIG. 6 is the schematic diagram for the latch associated with the memory in the transmitting and the receiving apparatus.

FIG. 6 is the schematic diagram for one bit of latch 14. The total latch is comprised of thirty-one additional such schematic diagrams.

The first group of elements labeled "Buffer 1" (the dotted surround) is one-fourth of an LS399 integrated circuit.

A gating structure at the left precedes flip-flop 60. This circuitry allows alternate inputs depending upon whether the flow of signal is into or out of memory 15.

In the first mode of operation, a bit comes from analog to digital ("A/D") converter 11 of FIG. 2. It enters one of two inputs to AND gate 61. The other input is from the "write mode" command, which comes from system control 2. This arrives at the gate through inverting amplifier 62. When both inputs are present an output from AND gate 61 becomes one input to NOR gate 63. An output therefrom is amplified by inverting amplifier 65 (inverting the phase) and enters the S terminal of flip-flop 60. Prior to phase inversion the NOR gate 63 output enters the R terminal of the flip-flop.

Clock 1A provides actuating pulses through inverting amplifier 65, to flip-flop terminal CK. All of the above enables the write mode, giving an output from the flip-flop at terminal Q.

The alterante source for the bit is from memory 15, arriving on "memory bit 1 out" conductor, to an input of AND gate 66. This is the read (out of memory) mode. The memory bit 1 output passes through elements 66, 63 and 64 and is stored in flip-flop 60. By logical level control either the output from analog to digital converter 11 or from memory 15 can be stored in flip-flop 60 of buffer 1.

When buffer 1 is full, the output is simultaneously transferred into "Buffer 2." This is one-eighth of an LS364 integrated circuit. The output enters the D terminal of flip-flop 68, which is also supplied with a clock 2 input through inverting amplifier 69. Clock 2 gives a pulse when buffer 1 has been filled and it is time to transfer that information to memory 15.

The output from buffer 2 passes from Q of flip-flop 68 through amplifier 70 to "memory bit 1 input" (to memory 15) and also through an amplifier 71 to supply bit 1 to "digital to analog (D/A) converter" 18. Inverting amplifier 72 accepts a "read/select A" input from system control 12 and exercises control over amplifier 71. This is to select the output of flip-flop 68 and place it on bit 1 input of D to A converter 18.

Subsequently, other read-selects B, C and D place the outputs of other flip-flops on the same input of the D to A converter.

Amplifier 71 is a tristate amplifier. When the input is "hi" the output goes to a very high impedance. Thus, the amplifier is not then "on line" and many such amplifiers, as thirty-two according to this invention, are connected in groups of four with outputs in parallel for sequential operation.

When control over amplifier 71 is exercised by amplifier 72, the output of amplifier 71 is either a binary 0 (a low voltage), or binary 1 (5 volts). The output impedance of amplifier 71 is then not high and it acts like a voltage source to drive a subsequent load.

Figure 7:
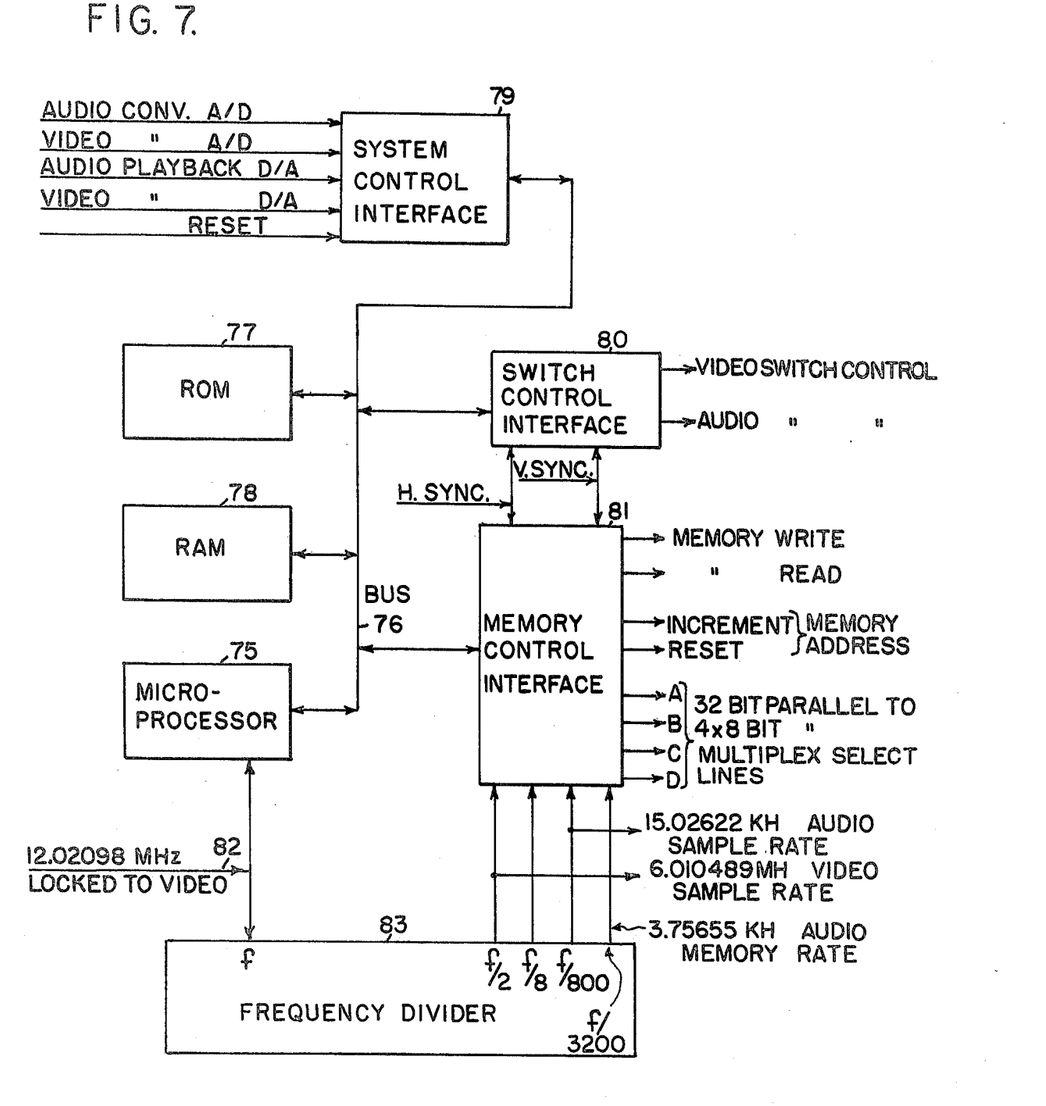
FIG. 7 is a block diagram of the microprocessor and associated elements of the system control block utilized in the transmitting and the receiving apparatus.

FIG. 7 is the block diagram for the system control block 12 of FIG. 2. Microprocessor 75 provides general control, according to a software program that has been prepared for it. The program is shown in the form of a flow chart in FIG. 8A. Typically, the microprocessor is an integrated circuit (IC) general purpose computer, such as the Intel 8085.

Bus 76 connects the microprocessor to and from the several other entities in FIG. 7. The bus typically comprises 8 lines for data, 16 lines for address, and a few more lines for control; i.e., read, write and timing.

Read only memory ("ROM") 77, which may be an Intel 2716, provides non-volatile storage for the forementioned program. Random access memory ("RAM") 78 is a semiconductor memory that has rewrite capability and random access, of 1024 8 bit bytes, such as two Intel 2114 ICs will provide.

System control interface 79 also connects to bus 76. It is comprised of conventional medium scale integration digital circuits with address decoding, device selection, tri-state gates to insert selected data on the bus, flip-flops to store selected data from the bus. These may be Texas Instruments 74LS240, LS30, LS138 and LS259.

Interface 79 serves to start conversion in the various analog to digital and digital to analog converters. That is, audio analog to digital converter 11 and video playback digital to analog converter 18 in FIG. 2, also, video analog to digital converter 41 and audio playback digital to analog converter 46 in FIG. 4.

There is also a "reset" connection between interface 79 and manual or automatic means of initially resetting the system.

Switch control interface 80 is connected to bus 76 and thus to microprocessor 75. It is also connected to the control of video switch 20 in FIG. 2, and separately to the control of audio switch 48 in FIG. 4. It is similar to interface 79, except for having different addresses.

Horizontal sync (synchronization) pulses are fed into interface 80 via one conductor and vertical sync is also fed in via another conductor.

Memory control interface 81 is connected to bus 76 and thus to microprocessor 75. It is also connected to memory 15; one line for memory write and another line for memory read. It is similar to interface 79.

An "increment" output to memory address counter 16 is provided by a conductor, and also a "reset" conductor for the counter.

Four conductors connect from interface 81, A, B, C, D, to MUX/DEMUX 14 in FIG. 2, via generic connection 17, as shown in FIG. 2. These arrange the 32 bit parallel signal into four 8 bit parallel signal lines to lower the frequency maximum required of the memory, as previously set forth.

The apparatus of this invention operates synchronously with the scanning of the television system with which it is associated. At conductor 82 in FIG. 7 a square waveform of 12.02098 MHz frequency is conveyed from phase-locked VCO oscillator 24 in FIG. 2. This is twice the frequency of the 382 cycles of waveform which fits into the net space along a video scanning line between leading edges of horizontal synchronizing pulses.

This 12.02098 MHz frequency serves as a clock to microprocessor 75 and as the maximum input frequency to frequency divider 83 of FIG. 7. Divider 83 is comprised of conventional TTL74190 and 74191 type integrated circuits, as from Texas Instruments Corp.

The first output of frequency divider 83 is a square waveform of half the input frequency; i.e., 6.010489 MHz. This enters memory control interface 81 for use as the video sampling rate in analog to digital conversion.

The second such output has a frequency of 1.502622 MHz and is used as the video memory clock rate; i.e., readout of memory 15, of FIG. 2. This is ⅛ of the input frequency to divider 83.

The third such output has a frequency of 15.02622 KHz and is 1/800 of the input frequency; i.e., the audio frequency sampling rate.

The fourth such output has a frequency of 3.75655 KHz, is 1/3200 of the input frequency, and is used as the audio memory clock rate.

Figure 8A:
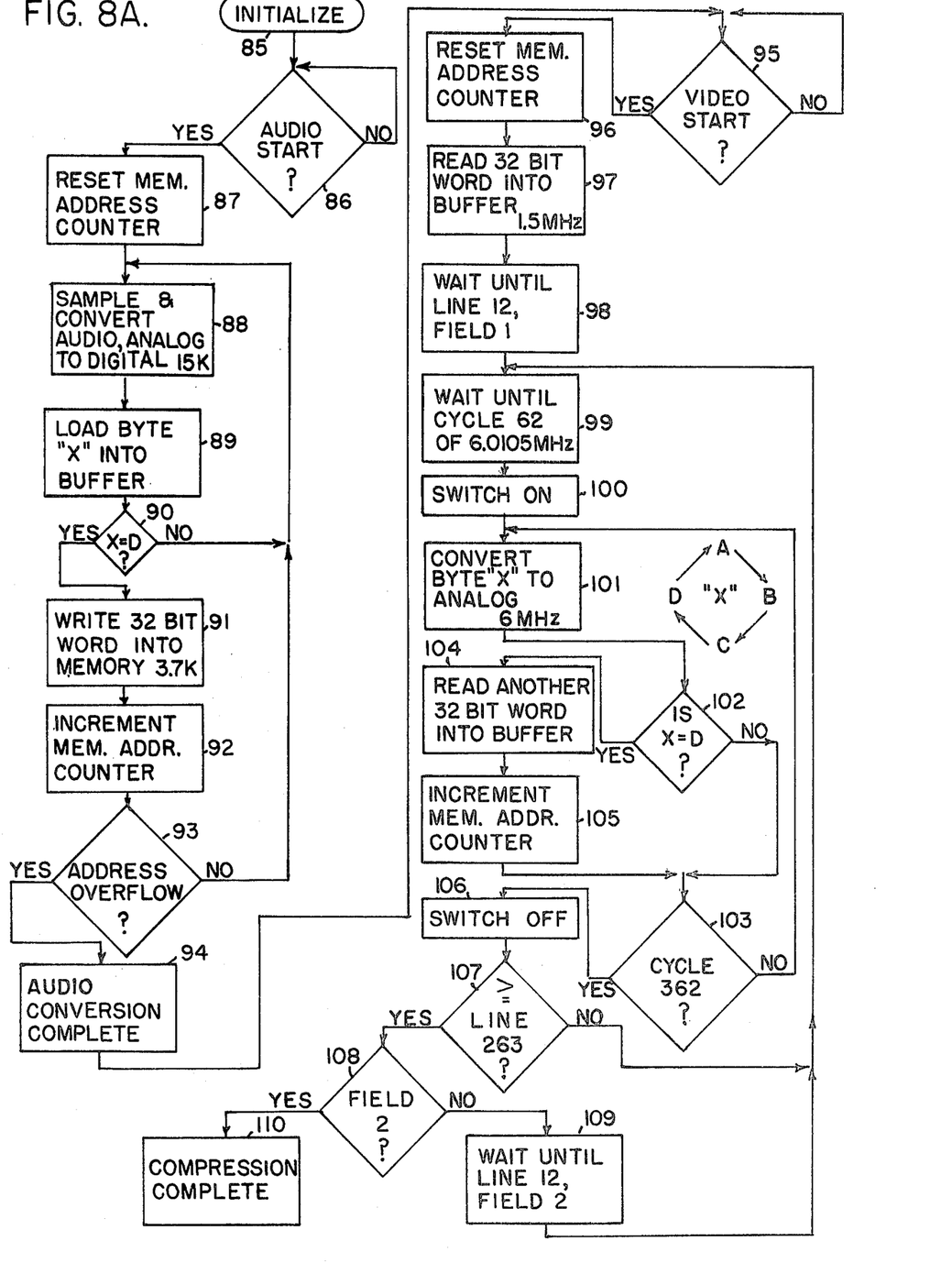
FIG. 8A is the flow chart for the microprocessor for compression of the audio frequency signal.
Figure 8B:
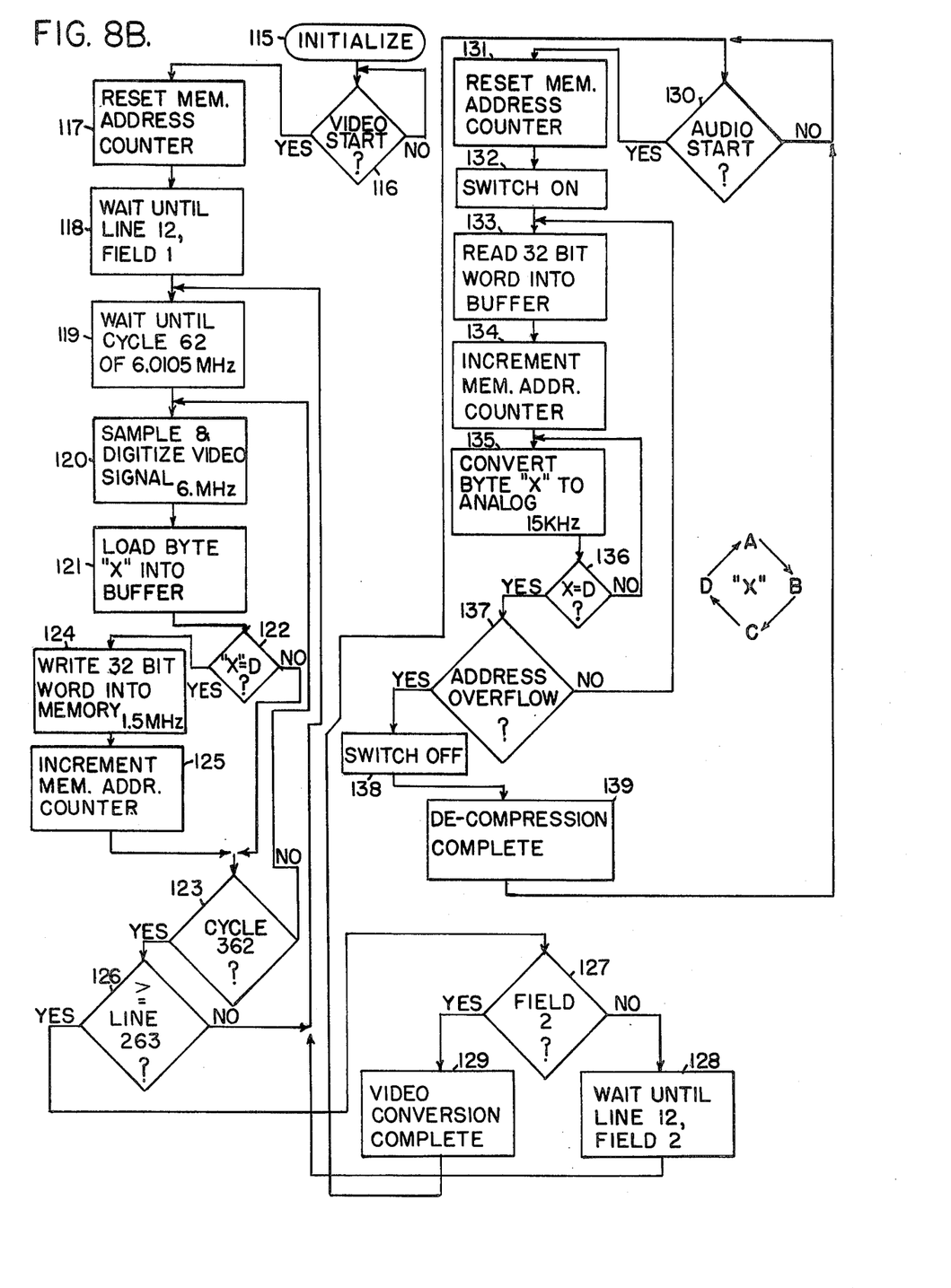
FIG. 8B is the flow chart for the microprocessor for the de-compression of the audio frequency information back to the original audio frequencies.

Interface 81 outputs A, B, C, D relate to FIGS. 6, 8A and 8B.

FIG. 8A gives the flow diagram for compression of the audio frequency signal for the system control entity of FIG. 7.

At the start, "initialize" 85 pertains to placing the microprocessor in operating condition. Thereafter, decision point 86 asks "should the audio start?". If the answer is "no" the function returns to the input of 86 and continues to ask the question until the answer is "yes".

The whole activity then begins. "Reset memory address counter" function 87 is accomplished. This is counter 16 in FIG. 2. Thereafter, the "sample and convert audio from analog to digital", at a rate of 15.026 KHz, function 88, is accomplished. This occurs in analog to digital converter 11 in FIG. 2.

Next, function 89 is to "load byte "X" into buffer"; i.e., into the input of FIG. 6.

Byte "X" has four values in the present embodiment; "A", "B", "C", and "D". That is, 8 bits flow from converter 11 into latch MUX/DEMUX 14 in FIG. 2, and the objective is to form a 32 bit word for enty into memory 15.

Thus, byte "A" is first loaded into the buffer. When this is completed the following question is asked at decision point 90, "is X=D?". When "A" only has been completed, the answer is obviously "no". Accordingly, the activity returns to the input of function 88 and the process that has been accomplished for "A" is now accomplished for "B". This is repeated for "C" and "D".

Then the answer to the question at decision point 90 is "yes".

Function 91 then comes into play; i.e., "write 32 bit word into memory "at a rate of 3.756 KHz.

Then follows function 92, "increment the memory address counter". This is address counter 16 in FIG. 2. This gives a measure of how full memory 15 has become.

The question is then asked, "address overflow?", at decision point 93. Overflow does occur when the address is greater than 37,500. If the address is less than that, the answer is "no" and so the activity returns back to the "sample and convert" function 88, to allow further filling of the memory.

When the overflow answer is "yes", the activity passes on the "audio conversion complete" 94, from which there comes the query "video start?" at the next decision point 95.

The term "video" is used because the audio is about to be read out of the memory at video speed and to become a television scanning line in video format.

If the answer to "video start?" is "no", then the function merely repeats itself, likely many times, until the answer is "yes".

When the answer is "yes", the activity passes on to "reset memory address counter" 96. This is so that the process of unloading the memory will be properly sequenced from the beginning.

The next activity is to "read a 32 bit word into the buffer" at a rate of 1.5026 MHz; function 97. That word is retained in the buffer and the next function, 98, is to "wait until line 12 of field 1" occurs. This is the television scanning activity and line 12 is within the vertical blanking interval.

The next function, 99, is to "wait until cycle 62 of 6.0105 MHz" on that line occurs. This arranges that the compressed audio shall not be impressed upon the television line waveform until the "picture" part of the line is reached. This avoids the horizontal synchronizing pulse and the back porch of the horizontal blanking pulse adjacent thereto, as has been previously described in connection with FIG. 1.

The next function, 100, is "switch on", which refers to video switch 20 of FIG. 2 being "on" to pass subsequent audio information that is now in video context.

The next function, 101, is "convert byte "X" to analog" at a rate of 6.0105 MHz". This occurs in digital to analog converter 18 of FIG. 2.

Next is the question, "is X=D", at decision point 102. If the anser is "no", another question is asked," is this cycle 362", at decision point 103; i.e., has the video line been filled? If that anser is "no", then the activity returns to the "convert byte "X", and the next value of "X" is processed. This is the same as occurs at previous functions 89 and 90, save that this conversion is opposite to the previous one and the frequency of operation is very much higher.

When the "is X=D?" answer is "yes" at 102, then function 104 is performed, "read another 32 bit word into buffer". Correspondingly, function 105, "increment memory address counter" is performed; this relating to element 16 in FIG. 2.

Thereafter, the question "is this cycle 362?" is asked at decision point 103. If the answer is "no", the return to further byte processing previously described occurs.

If the answer is "yes", the activity passes on to "switch off", function 106. This seals off output from this apparatus with respect to the basic video operation.

After this, decision point 107 is reached. The question is asked, "is the line number greater than or equal to line 263?". This is equivalent to asking if the first field has been completed. If the answer is "no", the activity returns quite far back, to "wait until cycle 62 of 67.0105 MHz on line", function 99, and the "X" functioning is resumed.

If the answer at decision point 107 is "yes", then the activity goes to another decision point, "field 2?", 108. If the answer at this decision point 108 is "no", then function 109, "wait until line 12, field 2", is involved, and the action is also sent back to before function 99.

If the answer at decision point 108 is "yes", then function 100, "compression complete" terminates the action.

FIG. 8B gives the flow diagram for de-compression of the audio information signal back to the original audio frequencies, relating to the functioning of the system control entity of FIG. 7.

The functioning set forth in FIG. 8B is similar to that in 8A, except that it is the inverse. That is, as may be seen from FIG. 1, the functioning of FIG. 8A takes waveform 1 to the very small waveform 2, while the functioning of FIG. 8B takes waveform 2 back to waveform 1.

In FIG. 8B "initialize" 115 puts the micrprocessor in operating condition. Thereafter, decision point 116 asks, "is this the video start?" This, of course, the compressed audio that is in video format. If the answer is "no", the activity returns to the input of 116 and continues to ask the question until the answer is "yes".

Then the whole activity begins. The "reset memory address counter", function 117, is accomplished.

Function 118, "wait until line 12 of field 1" next occurs.

Also, function 119, "wait until cycle 62 of 6.0105 MHz" next occurs. Both of these functions properly position the following functioning in time, so that only the net compressed audio is operated upon.

The next functon, 120, is "sample and digitize video", at the 6.0105 MHz rate. This "video" is the compressed audio.

The next function, 121, is to "load byte "X" into buffer". After this, the question is asked at decision point 122, "is X=D?". If the answer is "no", a second question is asked at decision point 123, "is this cycle 362?" If this answer is "no", the activity returns to the digitizing function of 120; then to another value of byte "X", and so on until all of the values, "A", "B", "C", and "D", have been processed.

Then the answer at decision point 122 is "yes", and the activity advances to function 124, "write 32 bit word into memory", at the 1.503 MHz rate. Following that, function 125 occurs, "increment memory address counter".

This leads to decision point 123, "is this cycle 362?" When the answer is "yes", the activity passes to another decision point, 126, "is the line greater than or equal to 263?".

If the answer is "no", the activity returns to function 119, and the process of writing into the memory continues.

If the answer is "yes", decision point 127, "is this field 2?" is interrogated.

If this answer is "no", the activity passes to function 128, "wait until line 12 of field 2", and from there back to function 119 for further processing.

If the answer is "yes", then function 129, "video conversion complete", occurs, and from there the second part of the decompression occurs.

The first part of the audio portion of the de-compression is decision point 130, "audio start?". If the answer is "no", then the function merely repeats itself, likely many times, until the answer is "yes".

When the answer is "yes", the activity passes to function 131, "reset memory address counter". This is so that the process of unloading the memory will be in sequence, starting at the beginning, and can be monitored.

The next function is 132, "switch on". This is switch 48 in FIG. 4, which passes audio frequency information when such is occurring, but gates off the channel when such information is absent.

The next activity is function 133, "read 32 bit word into buffer".

This is followed by function 134, "increment memory address counter", to accomplish the purposes previously explained.

Next is function 135, "convert byte "X" to analog" at 15.06 KHz. Parameter "X" takes the values "A", "B", "C", and "D", as before.

This activity is then questioned at decision point 136, "is "X"=D?". If the answer is "no", then the activity goes back to function 135 for completing the conversions until "D" is reached.

If the answer is "yes", the activity proceeds to decision point 137, "is there address overflow?". If the answer on overflow is "no", then the activity passes back to function 133, "read 32 bit word into buffer", for further processing of data.

Overflow occurs when the addresses are greater than 37,500 in the embodiment example chosen.

If the answer is "yes" at decision point 137, the activity passes to function 138, "switch off", since the audio information has now been delivered.

Finally, function 138, "de-compression is complete", is reached. Therefrom, the activity passes back to the beginning, decision point 130, so that subsequent information can be decompressed.

The playback of the 10 seconds of audio stored in the memory can be repeated as often as desired.

As previously explained, audio of reduced frequency range up to a playback of 30 seconds is easily arranged according to this invention.

For transmission of audio information according to this invention via a television transmitter (not shown) the "video" output of such information from video summation element 21 in FIG. 2 is connected to the video input of a television transmitter. This may also be the transmitting facility of a cable television system.

Similarly, for reception via a television receiver (not shown) the video input to low pass filter 40 in FIG. 4 is connected to the video frequency output of a television receiver.

Alternately, the compressed audio signal can be recorded on a video tape or disc by connecting the input of such a device to summation 21 in the recording mode and commanding that the compressed audio signal be read out of the apparatus of this invention.

Similarly, the compressed audio signal can be processed for reproducing in the original form by connecting the device to low pass filter 40 while it is operating in the reproduce mode.

I claim:

1. The method of communicating audio frequency information having an upper and a lower limit that includes the process steps of;
    (a) sampling and digitizing a time sequence of said audio frequency information over the time period of a plurality of video frames,
    (b) storing said digitized sequence thereof for compression into the time period of a whole video frame,
    (c) recalling the entire digitized sequence from storage at video line scanning frequency, at a rate very many times faster than the audio frequency,
    (d) converting the recalled digitized sequence to analog form,
    (e) entering that analog information upon the video horizontal lines of one video frame,
    (f) transmitting that video frame at video frequencies,
    (g) converting the transmitted frame of video frequency audio information from analog to digital form,
    (h) storing that converted frame of audio information in addressed digital form, and
    (i) uninterruptedly reading out and converting that audio information from digital to analog form at the original audio frequency rate.

2. The method of claim 1, in which;

(a) the audio frequency information is continuously sampled and subsequently digitally stored.

3. The method of claim 1, in which;
(a) the upper limits of the communicated audio frequencies and of the corresponding compression into the time period of a whole video frame are set by selection of an audio sampling and digitizing rate, a video digitizing rate, and a video converting to analog rate.

4. The method of claim 1, in which;
(a) the process of recalling the digitized sequence from storage is electronically synchronized with the video line scanning frequency.

5. The method of claim 4, in which;
(a) each horizontal line includes a blanking pulse, and
(b) said analog information is entered upon the video horizontal lines between the blanking pulses thereof.

6. The method of claim 5, in which;
(a) only the analog information that is entered upon the video horizontal lines between the blanking pulses thereof is converted to digital form.

7. Apparatus for communicating audio frequency information, comprising;
(a) means to digitize (11) a time period of a plurality of video frames of said audio frequency information for compression into the time period of a whole video frame,
(b) a first memory (15) connected to said means to digitize to digitally store said compressed time interval of audio frequency information,
(c) first clock means (12, 17) to read out the digitized audio frequency information stored in said first memory at a rate very many times that of audio frequency,
(d) means to convert (18) the read-out information to analog form, said means to convert connected to said first memory,
(e) means to transmit (21) the read-out information at video frequencies,
(f) means to convert (41) the transmitted information to digital form,
(g) a second memory (44) connected to said means to convert to digitally store said interval of audio frequency information at the very many times rate,
(h) second clock means (42) connected to said second memory to read out the original said time period of a plurality of video frames of digitized audio frequency information at the original audio frequency rate,
(i) means to convert (46) the read-out information at the original audio frequency rate from digital to analog form to reproduce the original audio frequency information,
(j) an electronic audio switch (48) connected to said means to convert the read-out information (46), and
(k) synchronizing means (42) connected to said switch to actuate it to pass only the original time interval of said audio frequency information.

8. The apparatus of claim 7, in which said means to transmit includes;
(a) means to continuously sample and store the audio frequency information.

9. The apparatus of claim 7, which additionally includes;

(a) means to permanently store the transmitted interval of information operatively related to said means to transmit, and to said means to convert (41) for converting and storing a whole frame of transmitted information in digital form.

10. The apparatus of claim 7, which additionally includes;
(a) a low pass audio frequency filter (10,47) at the input, and at the output of the whole apparatus, the cutoff frequency thereof fixed at or less than one-half the audio sampling rate, and
(b) a low pass video frequency filter (19,40) at the input to the means to transmit, and at the output of the means to transmit, the cutoff frequency thereof fixed at or less than one-half the video digitizing rate.

11. The apparatus of claim 7, in which said means to digitize includes;
(a) an electronic oscillator clock (24) operating at a fixed audio/video frequency rate to accomplish digitizing, and
(b) a frequency divider (83) connected to said electronic oscillator to provide both audio and video frequencies.

12. The apparatus of claim 7, which additionally includes;
(a) multiple bit latch means (14) interposed between said means to digitize and said first memory to input data into said first memory in a multiple parallel mode,
where said first memory is a RAM.

13. The apparatus of claim 7, which additionally includes;
(a) means to electronically synchronize (22) said first clock means to television scanning, and
(b) means to inhibit (12,20) the read out of information during the occurrence of television blanking pulses.

14. The apparatus of claim 13, in which;
(a) said means to inhibit includes an electronic video switch (20) interposed between said means to convert the read-out information to analog form and said means to transmit, and
(b) a connection from said means to inhibit (12,20) to said electronic video switch for the control thereof.

15. The apparatus of claim 7, in which;
(a) said first memory (15) is exclusively an electronic read-write memory.

16. The apparatus of claim 7, in which;
(a) said second memory (44) is exclusively an electronic read-write memory.

17. The apparatus of claim 7, which additionally includes;
(a) a system-control microprocessor (75) having an input-output bus interface connecting to;
(A) the analog to digital converter (11),
(B) said first memory (15),
(C) television synchronizing means (23), and
(D) multiple bit latch means (14).

18. The apparatus of claim 17, in which said television synchronizing means additionally includes;
(a) a frequency divider (83) operatively connected to television synchronizing means (82),
and having plural separate frequency outputs that extend from the video to the audio frequency ranges.

* * * * *